United States Patent
Xie et al.

(10) Patent No.: US 9,982,101 B2
(45) Date of Patent: May 29, 2018

(54) METHOD TO FUSE SILICONE AND THERMOPLASTIC RESIN

(71) Applicant: HANGZHOU FREETRON INDUSTRIAL CO., LTD., Hangzhou (CN)

(72) Inventors: Ming Xie, Hangzhou (CN); Kaixiang Shu, Hangzhou (CN)

(73) Assignee: HANGZHOU FREETRON INDUSTRIAL CO., LTD., Hangzhou (CN)

( * ) Notice: Subject to any disclaimer, the term of this patent is extended or adjusted under 35 U.S.C. 154(b) by 167 days.

(21) Appl. No.: 15/145,821

(22) Filed: May 4, 2016

(65) Prior Publication Data
US 2017/0114194 A1 Apr. 27, 2017

(30) Foreign Application Priority Data
Oct. 22, 2015 (CN) .......................... 2015 1 0689785

(51) Int. Cl.
*C08J 5/12* (2006.01)
*C08J 3/24* (2006.01)
(Continued)

(52) U.S. Cl.
CPC ................ *C08J 5/12* (2013.01); *B65D 43/00* (2013.01); *C08J 3/247* (2013.01); *C08J 7/00* (2013.01); *C09J 5/02* (2013.01); *C09J 5/06* (2013.01); *B29C 65/02* (2013.01); *B29C 65/48* (2013.01); *B29C 66/028* (2013.01); *B29C 66/612* (2013.01); *B29C 66/71* (2013.01); *B29C 66/7392* (2013.01); *B29C 66/919* (2013.01); *B29C 66/949* (2013.01); *B29L 2031/565* (2013.01); *C08J 2323/06* (2013.01); *C08J 2323/12* (2013.01); *C08J 2383/04* (2013.01);
(Continued)

(58) Field of Classification Search
CPC ................................. B21D 51/46; B29C 70/80
USPC ................................................. 156/242, 230
See application file for complete search history.

(56) References Cited

U.S. PATENT DOCUMENTS

4,650,387 A * 3/1987 Busch ................... B05C 5/0216
156/69
4,675,139 A * 6/1987 Kehe ....................... B29C 35/12
264/248

(Continued)

OTHER PUBLICATIONS

English Translation of CN102504317.*
"Softal and Plasma Treatment: An Overview." Jul. 13, 2013.*

*Primary Examiner* — Matthew Daniels
*Assistant Examiner* — Hana Page
(74) *Attorney, Agent, or Firm* — Gokalp Bayramoglu

(57) ABSTRACT

This invention discloses a method to fuse silicone and thermoplastic resin, comprising the following steps: Step A: conducting treatment twice on thermoplastic resin lid upon molding in plasma equipment under normal temperature, and opening the inert molecular chain of thermoplastic resin; wherein the power for treating the thermoplastic resin lid ranges 500 to 800 W, the time of treatment ranges from 5 s to 60 s; Step B: applying glue on the place for laying silicone gasket on thermoplastic resin lid, baking in the oven for 15-20 min; Step C: putting the treated thermoplastic resin lid and silicone gasket in step B into the over mold for encapsulation, the time of which is 2-3 min; conducting post vulcanization for 2 h after completing the encapsulation.

6 Claims, 1 Drawing Sheet

(51) Int. Cl.
  *B65D 43/00*     (2006.01)
  *C08J 7/00*      (2006.01)
  *C09J 5/02*      (2006.01)
  *C09J 5/06*      (2006.01)
  *B29C 65/48*     (2006.01)
  *B29C 65/00*     (2006.01)
  *B29L 31/56*     (2006.01)
  *B29C 65/02*     (2006.01)

(52) U.S. Cl.
  CPC .... *C09J 2423/046* (2013.01); *C09J 2423/048* (2013.01); *C09J 2423/106* (2013.01); *C09J 2423/108* (2013.01); *C09J 2483/006* (2013.01)

(56) References Cited

U.S. PATENT DOCUMENTS

| | | | |
|---|---|---|---|
| 9,650,179 B2* | 5/2017 | Sheikh | B65D 33/16 |
| 2005/0098261 A1* | 5/2005 | Tachino | B29C 66/1122 |
| | | | 156/273.3 |
| 2012/0205374 A1* | 8/2012 | Klumpen | A61J 1/1406 |
| | | | 220/200 |

* cited by examiner

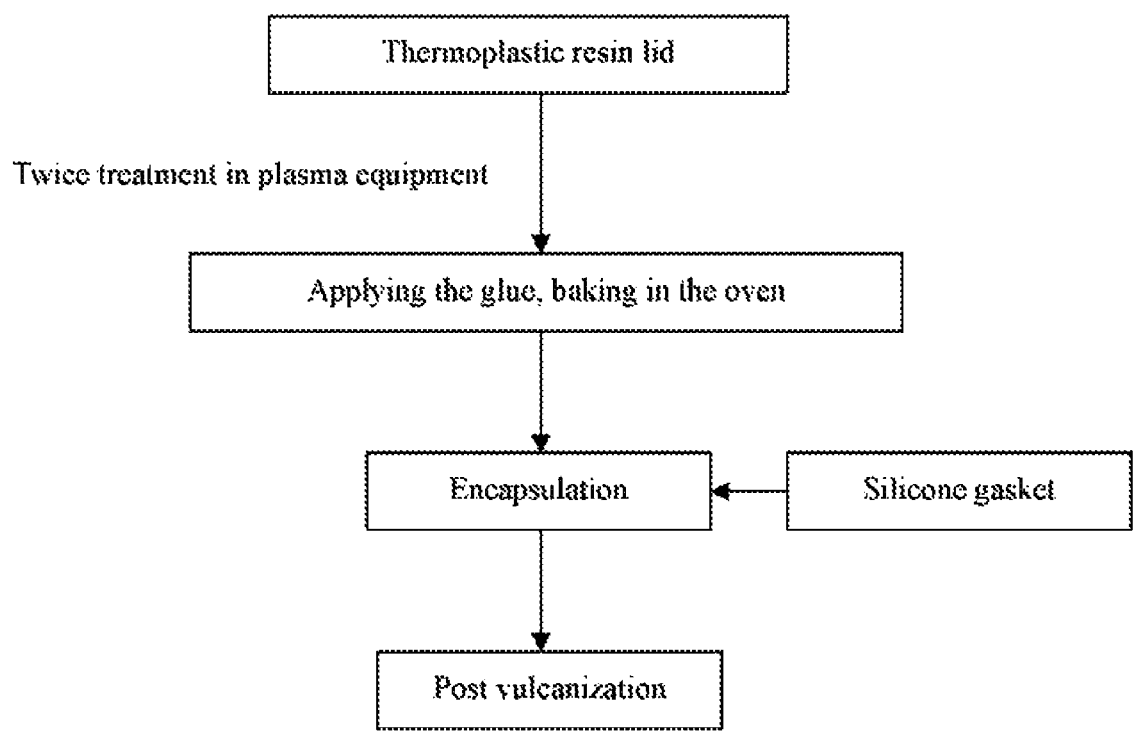

METHOD TO FUSE SILICONE AND THERMOPLASTIC RESIN

TECHNICAL FIELD

This invention falls within the technical field of packaging materials, especially relates to a method to fuse silicone gasket and thermoplastic resin lid by taking advantage of plasma technology.

BACKGROUND

Silicone is a kind of high-temperature-resistant material, while polyethylene and polypropylene are varieties with lightweight in plastics and with high level of heat resistance, therefore they are widely applied in the field of daily necessities.

At present, the lid for sealing bowl in the market is mostly made from thermoplastic resin materials such as polypropylene and polyethylene. There is a silicone gasket laid inside the lid to achieve the sealing effect. However, due to the failure of fusing silicone gasket and thermoplastic resin materials, they are not tightly connected. After using for a long time, there is smudgy object hidden in the chink, which is hard to clean. It not only affects the user experience, but also becomes unsafe and insanitary.

SUMMARY OF THE INVENTION

This invention aims at providing a method to fuse silicone gasket and thermoplastic resin lid by taking advantage of plasma technology against the shortage of current technology. This method, simple in technique process, which could tightly seal the silicone gasket and thermoplastic resin lid and solve the difficulty that silicone can only be used for high-temperature heating by microwave after being made into compound product with other high-temperature-resistant materials.

To reach the purpose of invention, this invention adopts the following schemes:

A method to fuse silicone and thermoplastic resin comprises the following steps:

A: Conducting treatment twice on thermoplastic resin lid upon molding in plasma equipment under normal temperature, and opening the inert molecular chain of thermoplastic resin. The power for treating the thermoplastic resin lid ranges from 500 to 800 W, and the time of treatment ranges from 5 to 60 seconds;

B: Applying glue on the place for laying silicone gasket on thermoplastic resin lid, baking it in the oven for 15-20 minutes;

C: Putting the treated thermoplastic resin lid and silicone gasket in step B into the over mold for encapsulation, the time of which ranges from 2 to 3 minutes. Conducting post vulcanization for 2 hours after completing the encapsulation.

As a preference: the above-mentioned thermoplastic resin refers to either polypropylene or polyethylene.

As a preference: the glue can be one or more kinds of high and low temperature glue.

As a preference: the temperature for encapsulation ranges from 100° C. to 130° C., the best temperature for encapsulation is 125° C.

As a preference: the temperature for post vulcanization ranges from 80° C. to 130° C., the best temperature for post vulcanization is 120° C.

Beneficial Effects:

This invention has the following significant features and effects:

(3) This invention creatively puts forward the method of making use of plasma flame technology to process the surface of thermoplastic resin, so as to open the inert molecular chain of thermoplastic resin, which provides a new thought for the fusion of thermoplastic resin with silicone, a kind of high-temperature-resistant material.

(4) This invention is simple in process, applicable to industrial production and effective in improving the production efficiency.

BRIEF DESCRIPTION OF THE DRAWINGS

FIG. 1 is the process flow chart of this invention.

DETAILED DESCRIPTION OF THE INVENTION

The invention has been described with respect to the following embodiments. However, those skilled in this field will readily understand that contents described in these embodiments are only for explaining this invention, which shall not and will not restrict this invention elaborated in the claims.

Embodiment 1: a method to fuse silicone and thermoplastic resin comprises the following steps:

Conducting treatment twice on polypropylene lid upon molding in plasma equipment under normal temperature, and opening the inert molecular chain of polypropylene. The power for treating the polypropylene lid is 500 W, and the time of treatment is 60 seconds; applying the glue on the place for laying silicone gasket on polypropylene lid, and baking it in the oven for 20 minutes; putting the treated polypropylene lid and silicone gasket into the over mold for encapsulation, the temperature of which is 125° C. and the time of which is 2 minutes. Then conducting post vulcanization at 120° C. for 2 hours after completing the encapsulation.

Embodiment 2: a method to fuse silicone and thermoplastic resin comprises the following steps:

Conducting treatment twice on polyethylene lid upon molding in plasma equipment under normal temperature, and opening the inert molecular chain of polyethylene. The power for treating the polyethylene lid is 800 W, the time of treatment is 5 s; applying the glue on the place for laying silicone gasket on polyethylene lid, baking it in the oven for 15 minutes; putting the treated polyethylene lid and silicone into the over mold for encapsulation, the temperature of which is 100° C. and the time of which is 3 minutes. Then conducting post vulcanization at 80° C. for 2 hours after completing the encapsulation.

Embodiment 3: a method to fuse silicone and thermoplastic resin comprises the following steps:

Conducting treatment twice on polypropylene lid upon molding in plasma equipment under normal temperature, and opening the inert molecular chain of polypropylene. The power for treating the polypropylene lid is 600 W, the time of treatment is 30 seconds; applying the glue on the place for laying silicone gasket on polypropylene lid, baking it in the oven for 20 minutes; putting the treated polypropylene lid and silicone gasket into the over mold for encapsulation, the temperature of which is 130° C. and the time of which is 2 minutes. Then conducting post vulcanization at 80° C. for 2 hours after completing the encapsulation.

Embodiment 4: a method to fuse silicone and thermoplastic resin comprises the following steps:

Conducting treatment twice on polyethylene lid upon molding in plasma equipment under normal temperature, and opening the inert molecular chain of polyethylene. The power for treating the polyethylene lid is 700 W, the time of treatment is 15 s; applying the glue on the place for laying silicone gasket on polyethylene lid, bake it in the oven for 15 minutes; putting the treated polyethylene lid and silicone gasket into the over mold for encapsulation, the temperature of which is 100° C. and the time of which is 3 minutes. Then conducting post vulcanization at 100° C. for 2 hours after completing the encapsulation.

Embodiment 5: a method to fuse silicone and thermoplastic resin comprises the following steps:

Conducting treatment twice on polypropylene lid upon molding in plasma equipment under normal temperature, and opening the inert molecular chain of polypropylene. The power for treating the polypropylene lid is 500 W, the time of treatment is 60 seconds; applying the glue on the place for laying silicone gasket on polypropylene lid and baking it in the oven for 20 minutes; putting the treated polypropylene lid and silicone gasket into the over mold for encapsulation, the temperature of which is 125° C. and the time of which is 3 minutes. Then conducting post vulcanization at 130° C. for 2 hours after completing the encapsulation.

Embodiment 6: a method to fuse silicone and thermoplastic resin comprises the following steps:

Conducting treatment twice on polyethylene lid upon molding in plasma equipment under normal temperature, and opening the inert molecular chain of polyethylene. The power for treating the polyethylene lid is 800 W, the time of treatment is 10 seconds; apply the glue on the place for laying silicone gasket on polyethylene lid, baking it in the oven for 15 minutes; putting the treated polyethylene lid and silicone gasket into the over mold for encapsulation, the temperature of which is 125° C. and the time of which is 2 minutes. Then conducting post vulcanization at 100° C. for 2 hours after completing the encapsulation.

Apparent to those skilled in this field that this invention patent is not limited to details of the above-mentioned exemplary embodiments. It can be realized in other specific forms without departing from the spirit or basic features of this invention patent. The scope of protection of this invention patent is limited by claims, therefore it aims at embracing all changes fallen within the definition and scope of equivalent components of claims into this invention patent, and any mark in drawings attached to claims shall not be regarded as the restriction of claims involved.

We claim:

1. A method to fuse silicone and thermoplastic resin, comprising the following steps:
   A: conducting plasma treatment twice on a thermoplastic resin lid upon molding in plasma equipment under normal temperature, and opening the inert molecular chain of thermoplastic resin; wherein the power for treating the thermoplastic resin cover ranges from 500 to 800 W, the time of treatment ranges 5 to 60 seconds;
   B: applying a glue on the place for laying a silicone gasket on the thermoplastic resin lid, and baking in the oven for 15-20 minutes;
   C: putting the treated thermoplastic resin lid and the silicone gasket in step B into an over mold for encapsulation, the time of which ranges from 2 to 3 minutes; conducting post vulcanization for 2 hours after completing the encapsulation.

2. The method according to claim 1, wherein the thermoplastic resin is selected from a group consisting of polypropylene and polyethylene.

3. The method according to claim 1, wherein a temperature for encapsulation ranges from 100° C. to 130° C.

4. The method according to claim 1, wherein a temperature for the post vulcanization ranges from 80° C. to 130° C.

5. The method according to claim 3, wherein the temperature for encapsulation is 125° C.

6. The method according to claim 4, wherein the temperature for post vulcanization is 120° C.

* * * * *